United States Patent
Krishnan et al.

(10) Patent No.: US 11,158,038 B2
(45) Date of Patent: Oct. 26, 2021

(54) SYSTEM FOR EVALUATING CORRECTNESS OF GEAR MESH AND AUTOMATICALLY UPDATING RESULTS ON A PRODUCTION SYSTEM

(71) Applicant: dMACQ Software Pvt. Ltd., Mumbai (IN)

(72) Inventors: Srikant Krishnan, Mumbai (IN); S Narayanan, Mumbai (IN); Madhura Patil, Mumbai (IN); Deb Sharma, Mumbai (IN)

(73) Assignee: dMACQ Software PVT, Ltd., Mumbai (IN)

( * ) Notice: Subject to any disclaimer, the term of this patent is extended or adjusted under 35 U.S.C. 154(b) by 139 days.

(21) Appl. No.: 16/805,763

(22) Filed: Feb. 29, 2020

(65) Prior Publication Data
US 2021/0272265 A1    Sep. 2, 2021

(51) Int. Cl.
| *F16H 57/01* | (2012.01) |
| *G06K 7/14* | (2006.01) |
| *G06T 7/00* | (2017.01) |
| *G06T 7/90* | (2017.01) |

(Continued)

(52) U.S. Cl.
CPC ........... *G06T 7/0004* (2013.01); *F16H 57/01* (2013.01); *G01M 13/021* (2013.01); *G06K 7/1413* (2013.01); *G06K 7/1417* (2013.01); *G06T 7/90* (2017.01); *G06T 11/60* (2013.01);

(Continued)

(58) Field of Classification Search
CPC .............. F16H 57/01; F16H 2057/012; G01M 13/021; G06K 7/1413; G06K 7/1417; G06T 7/0004; G06T 7/90; G06T 11/60; G06T 2207/30164
See application file for complete search history.

(56) References Cited

U.S. PATENT DOCUMENTS

| 2006/0029257 A1* | 2/2006 | Eguchi | G06T 7/64 |
| | | | 382/108 |
| 2007/0058854 A1* | 3/2007 | Caskey | G06T 7/0004 |
| | | | 382/152 |

(Continued)

FOREIGN PATENT DOCUMENTS

| JP | 62046228 A | * | 2/1987 | .......... G01M 13/021 |
| JP | 03100435 A | * | 4/1991 | |

(Continued)

*Primary Examiner* — Yubin Hung
(74) *Attorney, Agent, or Firm* — Kirby Drake (57) ABSTRACT

A method for automated gear contact pattern verification includes applying a colored powder to at least one gear to be meshed to form contacts on at least one gear tooth of the at least one gear, and using the smartphone, capturing images of the at least one gear tooth. A matching algorithm run on the smartphone may include identifying bounding points of a yellow portion of the at least one gear tooth, the bounding points including a midpoint of the yellow portion; identifying a gear mesh area between the bounding points and a midpoint of the gear mesh area; and determining a deviation in the midpoints of the yellow portion and gear mesh area, wherein the deviation may between approximately 25% and 80%. The test results are displayed on the smartphone, the test results including at least an indication of pass or fail.

18 Claims, 7 Drawing Sheets

(51) Int. Cl.
*G01M 13/021* (2019.01)
*G06T 11/60* (2006.01)

(52) U.S. Cl.
CPC .............. *F16H 2057/012* (2013.01); *G06T 2207/30164* (2013.01)

(56) References Cited

U.S. PATENT DOCUMENTS

| | | | | |
|---|---|---|---|---|
| 2009/0184836 | A1* | 7/2009 | Kotula | G05B 23/0245 340/674 |
| 2010/0021046 | A1* | 1/2010 | Nagahama | G06T 7/001 382/145 |
| 2010/0158349 | A1* | 6/2010 | George | G01B 11/2416 382/152 |
| 2011/0222655 | A1* | 9/2011 | Murakami | G01N 23/18 378/54 |
| 2017/0122837 | A1* | 5/2017 | Mtauweg | G01M 13/021 |

FOREIGN PATENT DOCUMENTS

| | | | |
|---|---|---|---|
| JP | 2005098911 A | * | 4/2005 |
| JP | 2010266244 A | * | 11/2010 |

* cited by examiner

SYSTEM FOR EVALUATING CORRECTNESS OF GEAR MESH AND AUTOMATICALLY UPDATING RESULTS ON A PRODUCTION SYSTEM

FIELD OF THE DISCLOSURE

The present disclosure generally relates to gear testing, and more particularly to automated gear contact pattern verification.

BACKGROUND

Figure 1:
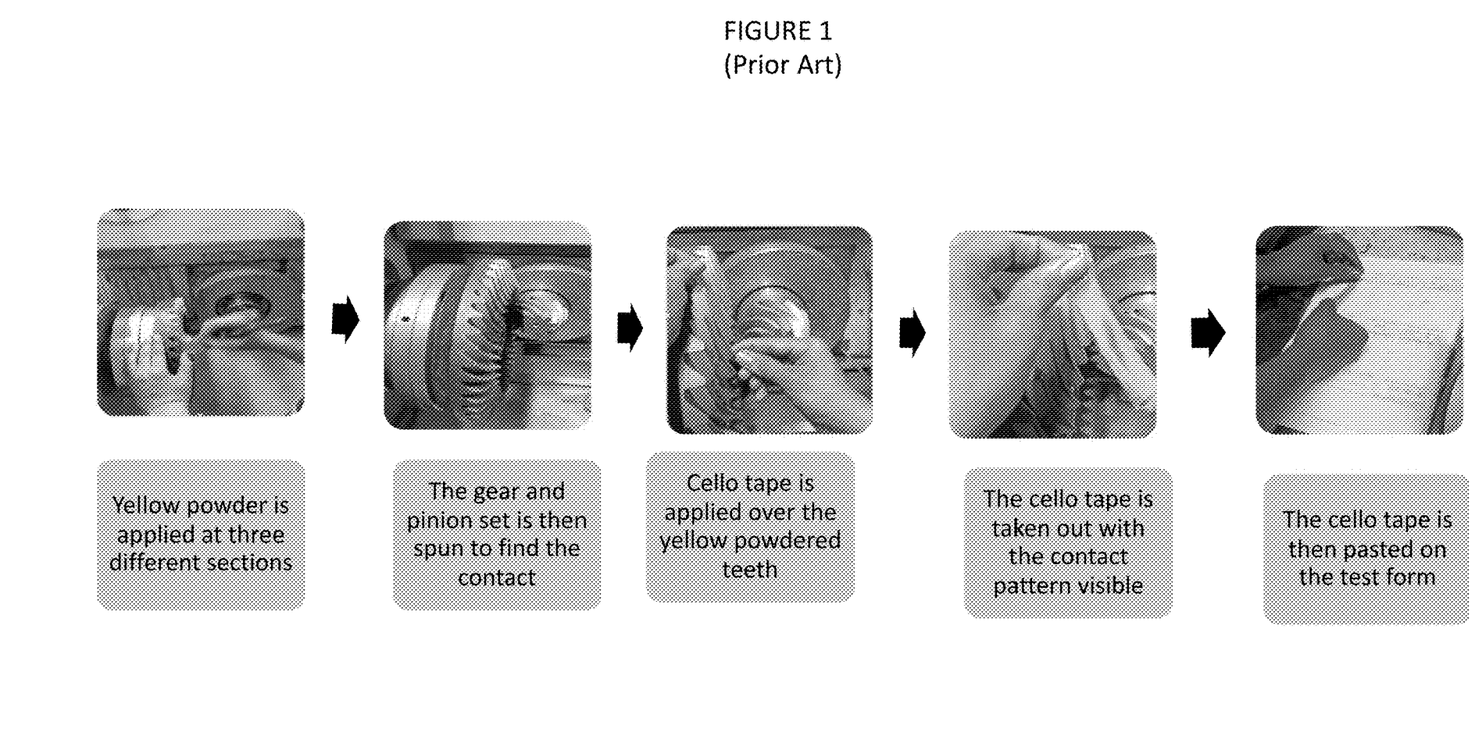
FIG. 1 depicts a pre-automation procedure according to the prior art.

When gears are manufactured, or maintained, it may be necessary to determine the correctness of their mesh with other gears. In a pre-automation manual process, a test operator scans the barcode affixed to the part to retrieve the serial number and part number of the pinion and gear. The test operator fills out a paper-based test form used for recording the test carried out with information received from scanning the barcode. As depicted in FIG. 1, yellow powder may be applied at three different sections. The gear and pinion set may be spun to find the contact. A transparent, cellulose-based adhesive tape, such as Cellotape, may be applied over the yellow powdered teeth to capture a contact pattern associated with the gear. The tape may then be taken out with the contact pattern visible, and the tape may be pasted on or otherwise attached to a test form. The test form is filled out, and the test operator visually checks the images (present on the tape) with a master image for the contact pattern. All of these steps are done manually.

The test operator provides his/her opinion as to whether the gear has passed or failed the test based on visual comparison of the actual images against the master image. The test form thus created needs to be approved by the Quality Manager. Once approved by Quality Manager, the test form is sent to the test operator so that he/she can let the product move to next stage of the process. The test form is then entered into a production enterprise resource planning (ERP) system. The ERP operator enters the test results against the part number in the ERP. The production system gets updated, and the test form is then filed in a physical file.

SUMMARY

Embodiments of the present disclosure may provide a method for automated gear contact pattern verification, the method comprising: applying a colored powder to at least one gear to be meshed to form contacts on at least one gear tooth of the at least one gear; using an application on a smartphone, scanning a barcode on the at least one gear to obtain a part number or a serial number associated with the at least one gear; using the smartphone, capturing images of the at least one gear tooth at three predetermined angles; using a matching algorithm run on the smartphone, the matching algorithm comprising: identifying a gear type based on the part number or serial number; identifying bounding points of a yellow portion of the at least one gear tooth, the bounding points including a midpoint of the yellow portion; identifying a bottom-left region, a bottom-right region, a top-left region, and a top-right region of the at least one gear tooth within the bounding points of the yellow portion; identifying the midpoint of the gear mesh area; identifying a region from bottom-left, bottom-right, top-left, and top-right where the midpoint of the gear mesh area is located; and determining a deviation in the midpoints of the yellow portion and the midpoint of the gear mesh area, wherein the acceptable deviation may be configured by a user to pass gear contact pattern verification, and the acceptable deviation may be in the range between 25% and 80%; and displaying test results on the smartphone, the test results including at least an indication of pass or fail. The capturing step may further include using pre-configured guides displayed on the application, the pre-configured guides including red guides; and cropping the captured images by recording pixel values of red guides and identifying bounding points, wherein the bounding points are identified by identifying a first and a last occurrence of the red guides on the x and y axes. After cropping the captured images, clusters of color may be identified in the captured images; and the clusters of color may be confirmed to be within pre-determined ranges and cover an area above a pre-determined set count. The pre-determined ranges may be $100<R<255$, $100<G<255$, and $0<B<120$ and the pre-determined set count may be at least 5000 pixels. The three pre-determined angles may be 0, 120, and 270 degrees. At the conclusion of the capturing step, six images may be captured, the six images comprising: angle 0—forward, angle 0—reverse, angle 120—forward, angle 120—reverse, angle 270—forward, and angle 270—reverse. The midpoint of the yellow portion may be identified using the formula: $yellow\_x\_mid=(max(x\_yellow)+min(x\_yellow))/2$ and $yellow\_y\_mid=(max(y\_yellow)+min(y\_yellow))/2$. The midpoint of the gear mesh area may be identified using the formula: $black\_x\_mid=(max(x\_black)+min(x\_black))/2$ and $black\_mid=(max(y\_black)+min(y\_black))/2$. The deviation in the midpoints of the yellow portion and gear mesh area may be determined using the formula: $pct\_x=((yellow\_x\_mid-black\_x\_mid)/yellow\_x\_mid)*100$ and $pct\_y=((yellow\_y\_mid-black\_y\_mid)/yellow\_y\_mid)*100$. The test results may be displayed as a QR code. The method may include scanning the QR code in a production system, wherein when the QR code is scanned, the enterprise resource planning (ERP) is updated in real-time over a wireless network.

Other embodiments of the present disclosure may provide a method for automated gear contact pattern verification, the method comprising: using the smartphone, capturing images of at least one gear tooth at three predetermined angles; using a matching algorithm run on the smartphone, the matching algorithm comprising: identifying bounding points of a yellow portion of the at least one gear tooth, the bounding points including a midpoint of the yellow portion, wherein the midpoint of the yellow portion is identified using the formula: $yellow\_x\_mid=(max(x\_yellow)+min(x\_yellow))/2$ and $yellow\_y\_mid=(max(y\_yellow)+min(y\_yellow))/2$; identifying a gear mesh area between the bounding points and a midpoint of the gear mesh area, wherein the midpoint of the gear mesh area is identified using the formula: $black\_x\_mid=(max(x\_black)+min(x\_black))/2$ and $black\_y\_mid=(max(y\_black)+min(y\_black))/2$; and determining a deviation in the midpoints of the yellow portion and gear mesh area, wherein the deviation in the midpoints of the yellow portion and gear mesh area is determined using the formula: $pct\_x=((yellow\_x\_mid-black\_x\_mid)/yellow\_x\_mid)*100$ and $pct\_y=((yellow\_y\_mid-black\_y\_mid)/yellow\_y\_mid)*100$, wherein the deviation may be configured by the user to pass gear contact pattern verification, and the acceptable deviation may be in the range between 25% and 80%; and displaying test results on the smartphone, the test results including at least an indication of pass or fail. The capturing step may further include using pre-configured guides displayed on the application, the pre-configured guides including red guides; and cropping the captured images by recording pixel values of red guides and identifying bounding points, wherein the bounding points are identified by identifying a first and a last occurrence of the red guides on the x and y axes. The method also may include after cropping the captured images, identifying clusters of color in the captured images; and confirming that the clusters of color are within pre-determined ranges and cover an area above a pre-determined set count. The pre-determined ranges may be 100<R<255, 100<G<255, and 0<B<120, and the pre-determined set count may be at least 5000 pixels. At the conclusion of the capturing step, six images may be captured, the six images comprising: angle 0—forward, angle 0—reverse, angle 120—forward, angle 120—reverse, angle 270—forward, and angle 270 reverse.

Further embodiments of the present disclosure may provide a method for automated gear contact pattern verification, the method comprising: applying a colored powder to at least one gear to be meshed to form contacts on at least one gear tooth of the at least one gear; using an application on a smartphone, scanning a barcode on the at least one gear to obtain a part number or a serial number associated with the at least one gear; using the smartphone, capturing images of the at least one gear tooth at three predetermined angles, the capturing step comprising: using pre-configured guides displayed on the application, the pre-configured guides including red guides; cropping the captured images by recording pixel values of red guides and identifying bounding points, wherein the bounding points are identified by identifying a first and a last occurrence of the red guides on the x and y axes; identifying clusters of color in the captured images; and confirming that the clusters of color are within pre-determined ranges and cover an area above a pre-determined set count; using a matching algorithm run on the smartphone, the matching algorithm comprising: identifying the gear type based on the part number or serial number; identifying bounding points of a yellow portion of the at least one gear tooth, the bounding points including a midpoint of the yellow portion; identifying a bottom-left region, a bottom-right region, a top-left region and a top-right region of the at least one gear tooth within the bounding points of the yellow portion; identifying a midpoint of the gear mesh area; identifying a region from bottom-left, bottom-right, top-left, and top-right where the midpoint of the gear mesh area is located; and determining a deviation in the midpoint of the yellow portion and midpoint of the gear mesh area, wherein the acceptable deviation is configured by a user to pass the gear contact pattern verification, and the acceptable deviation is in the range between 25% and 80%; and displaying test results on the smartphone, the test results including at least an indication of pass or fail. The midpoint of the yellow portion may be identified using the formula: yellow_x_mid=(max(x_yellow)+min(x_yellow))/2 and yellow_y_mid=(max(y_yellow)+min(y_yellow))/2. The midpoint of the gear mesh area may be identified using the formula: black_x_mid=(max(x_black)+min(x_black))/2 and black_y_mid=(max(y_black)+min(y_black))/2. The deviation in the midpoints of the yellow portion and gear mesh area may be determined using the formula: pct_x=((yellow_x_mid−black_x_mid)/yellow_x_mid)*100 and pct_y=((yellow_y_mid−black_y_mid)/yellow_y_mid)*100.

BRIEF DESCRIPTION OF THE DRAWINGS

For a more complete understanding of this disclosure, reference is now made to the following description, taken in conjunction with the accompanying drawings, in which.

DETAILED DESCRIPTION

Systems and methods according to embodiments of the present disclosure may provide for automated gear contact pattern verification which improves on the traditional manual process of applying colored powder to the gears and comparing the residual area visually with master images to determine a pass or fail result. Systems according to embodiments of the present disclosure may provide for automatic evaluation of the extent of the mesh with the gears and then indicate a pass or fail result. These systems and methods may be used in the automobile industry; however, other industries may utilize the systems and methods without departing from the present disclosure.

Automated gear contact pattern verification according to embodiments of the present disclosure may provide a variety of benefits which will be described in more detail herein, including but not limited to, elimination of dependence on manual (visual) check through use of mathematical models of image/contact measurement and confirmation, elimination of the manual process of inputting details such as part numbers and serial numbers, elimination of the requirement for Quality Manager approval as the rules for passing the quality test (master images) may be pre-defined scientifically, and elimination of the manual process of entering the result into a supervisory control and data acquisition (SCADA) system. In addition, systems and methods according to embodiments of the present disclosure eliminate manual filing and maintenance of physical paper files, and these systems and methods may eliminate human error in the comparison process. Moreover, the entire time taken for quality assurance verification with respect to each gear tested may be reduced by over 70% using systems and methods according to embodiments of the present disclosure.

Automated gear contact pattern verification according to embodiments of the present disclosure may be initiated following application of colored (often yellow) powder to the gears to be meshed and then spinning/turning the gear and pinion set in the forward and reverse directions to form contacts on the gear teeth. This may leave a powder residue on both sides of the teeth where the gears have not meshed properly. Systems and methods according to embodiments of the present disclosure may be performed using a smartphone application to capture one or more images of the meshed gears. However, it should be appreciated that applications may be utilized on or with technology other than smartphones, including, but not limited to, tablets, cameras, and computers, without departing from the present disclosure. The technology should be able to at least perform scanning and image capture operations as well as digital transfer of data, as will be described in more detail below.

Figure 2:
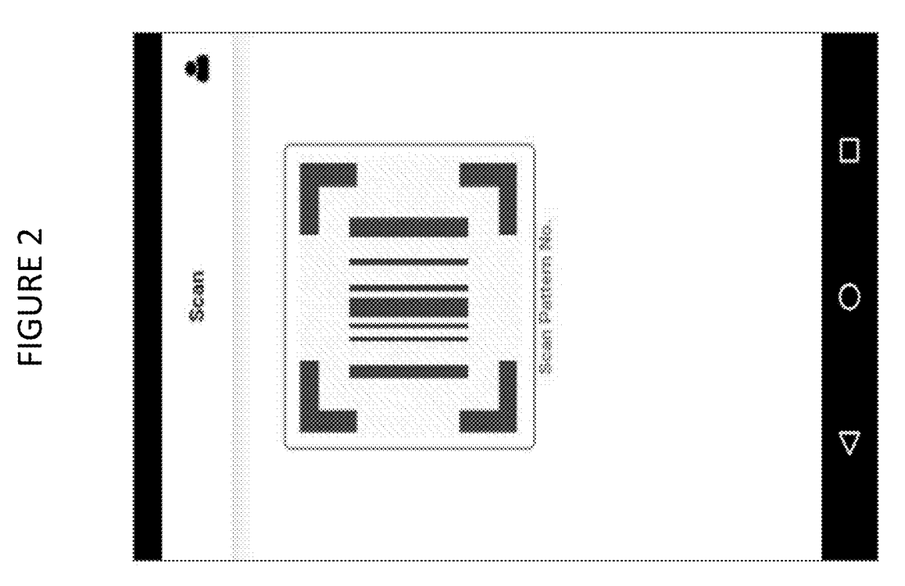
FIG. 2 depicts a screen shot of a scanning step using a smartphone according to an embodiment of the present disclosure.

FIG. 2 depicts a screen shot of a scanning step using a smartphone according to an embodiment of the present disclosure. In this embodiment of the present disclosure, an operator may scan a barcode on the gear using an application that may be provided on the smartphone. By scanning the barcode, the operator may be provided with the part number and/or serial number that is associated with the gear and pinion set (i.e., the gear type based on stored part numbers). Using the part number, the smartphone application may be utilized to identify to which group the gear and pinion set belongs. Depending on the group that is identified, a preview window may be displayed to the operator so that he/she may capture images/pictures of the gear and pinion set.

Figure 3A:
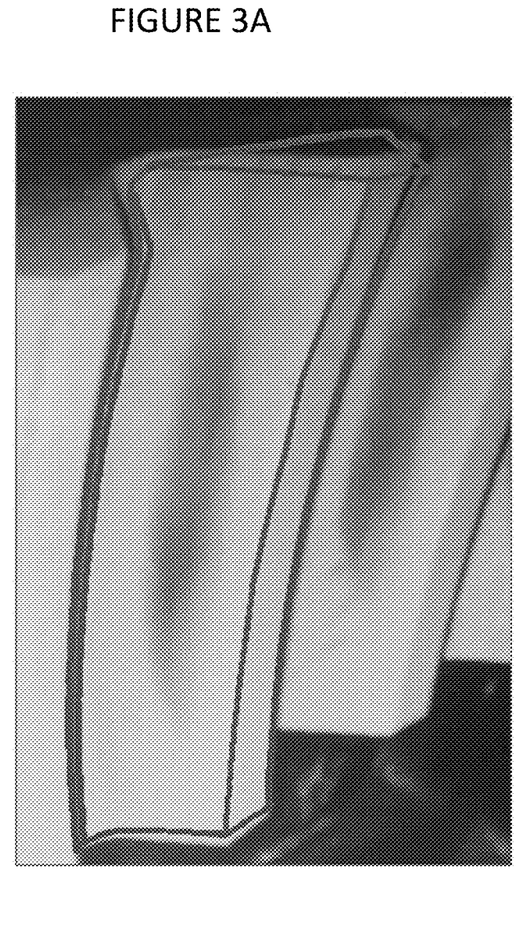
FIG. 3A depicts an image of a single gear tooth of the gear pattern that may be captured using a smartphone application to perform automated gear contact pattern verification according to an embodiment of the present disclosure.
Figure 3B:
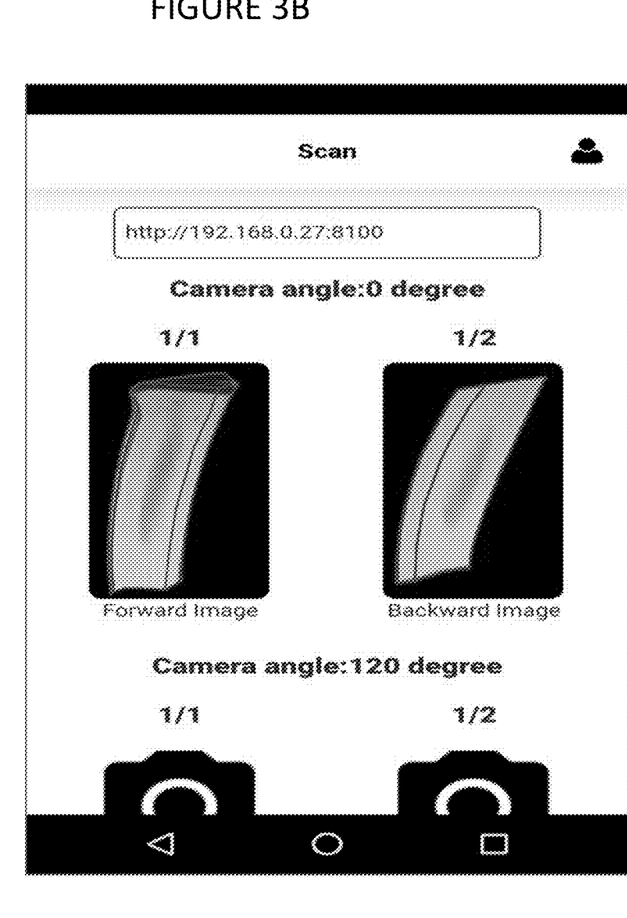
FIG. 3B depicts a screen shot of pre-configured guides on a smartphone application to capture an image according to an embodiment of the present disclosure.

FIG. 3A depicts an image of a single gear tooth of the gear pattern that may be captured using a smartphone application to perform automated gear contact pattern verification according to an embodiment of the present disclosure. The operator may be presented with pre-configured guides (such as provided in FIG. 3B) on the smartphone application so as to eliminate, or at least reduce, manual errors that may occur when capturing the image. Depending on the gear type, picture guides for the specified gear type may be displayed on or using the smartphone's camera application. Once the picture guides are displayed, the user may be prompted to take a picture of a tooth with the residue within the picture guide for the front of the tooth (one side of the tooth). The user may then be prompted to repeat this process of image capture for the back of the tooth.

As depicted in FIG. 3A, the operator may be provided with red guides to crop the image that may be captured using a camera contained in a smartphone in an embodiment of the present disclosure. Cropping may be performed by recording the pixel values of the red that appears in the guides around the captured image and then identifying the bounding points. The bounding points may be found by identifying the first and last occurrence of red on the x and y axis. After the image has been cropped, clusters of color may be identified in the image. As part of this step, the yellow color in the image should be within a specific range and cover an area above a set count. In an embodiment of the present disclosure, for an image to be considered valid, the image may contain at least 5000 pixels that have RGB values in the following ranges: $100<R<255$, $100<G<255$, and $0<B<120$. If these conditions are not satisfied, the user may be prompted to recapture the image. A yellow mask may be applied on the image. The first and last occurrence of yellow region on the x and y axis may be recorded. This may provide the bounding points of the yellow portion of a single gear tooth. The midpoint of the yellow region may be found using the following formula:

$$yellow\_x\_mid=(max(x\_yellow)+min(x\_yellow))/2$$

$$yellow\_y\_mid=(max(y\_yellow)+min(y\_yellow))/2$$

The gear mesh area (black region) between the yellow bounding points may be calculated using the yellow bounding points in the previous step. The mid-point may then be found using the following formula:

$$black\_x\_mid=(max(x\_black)+min(x\_black))/2$$

$$black\_y\_mid=(max(y\_black)+min(y\_black))/2$$

The deviation in midpoints of the yellow and black regions may then be determined using the following formula:

$$pct\_x=((yellow\_x\_mid-black\_x\_mid)/yellow\_x\_mid)*100$$

$$pct\_y=((yellow\_y\_mid-black\_y\_mid)/yellow\_y\_mid)*100$$

The deviation should be in a specified range to pass the gear mesh verification test. It should be appreciated that the default range may be approximately between 25% and 80% in an embodiment of the present disclosure. However, there may be embodiments of the present disclosure where the maximum deviation to accept the gear mesh as valid is user-settable.

A user can set four values defining the tolerance percentage that is acceptable for each corresponding gear group. The values may correspond to left, right, top, and bottom as depicted in the exemplar table below.

| Gear Group No. | Left | Right | Top | Bottom |
|---|---|---|---|---|
| 1 | 40 | 40 | 50 | 25 |
| 2 | 30 | 60 | 40 | 50 |
| 3 | 20 | 80 | 40 | 40 |

With respect to x-axis deviation, negative may be when the center of black is on the right of center of yellow, and positive may be when the center of black is on left of center of yellow. With respect to y-axis deviation, negative may be when the center of black is on the bottom of center of yellow, and positive may be when the center of black is on top of center of yellow.

FIGS. 5A-5D depict user-defined tolerances according to an embodiment of the present disclosure.

Figure 5A:
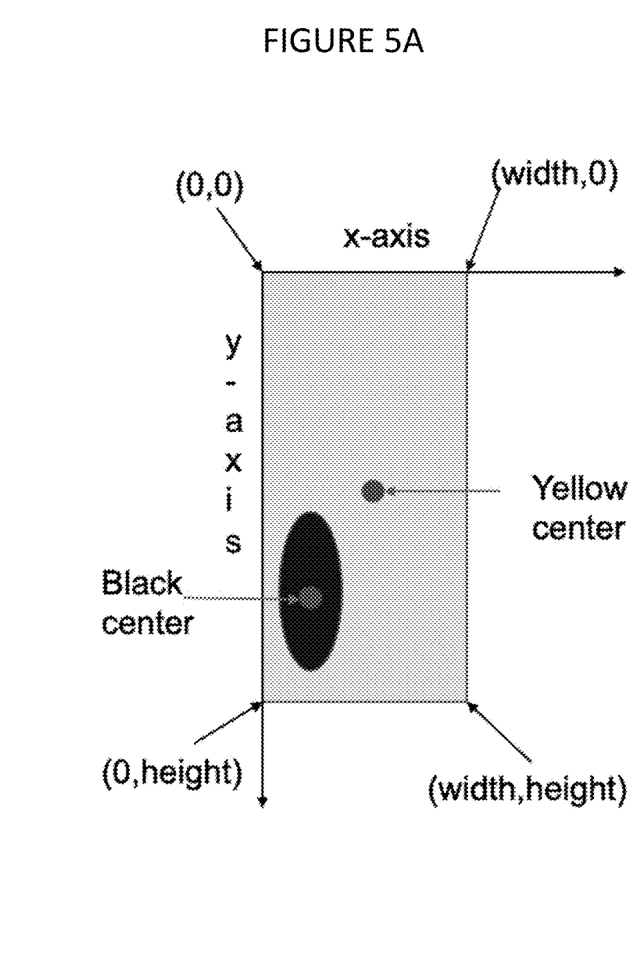
FIGS. 5A-5D depict user-defined tolerances according to an embodiment of the present disclosure.

FIG. 5A depicts X Left, Y Bottom which may be the deviation of center of the black region with respect to the yellow region. Two deviations may be calculated:

$$x\text{-axis deviation}=((x \text{ coordinate (cord) of Yellow center} - x \text{ coordinate of Black center})/x \text{ coordinate of Yellow center})*100$$

$$y\text{-axis deviation}=((y \text{ coordinate of Yellow center} - y \text{ coordinate of Black center})/y \text{ coordinate of Yellow center})*100$$

FIG. 5A depicts that the black center is to the left and bottom with respect to the yellow center. In this case, the left and bottom tolerance from the user-defined tolerance may be used to determine pass or fail of this gear set.

Figure 5B:
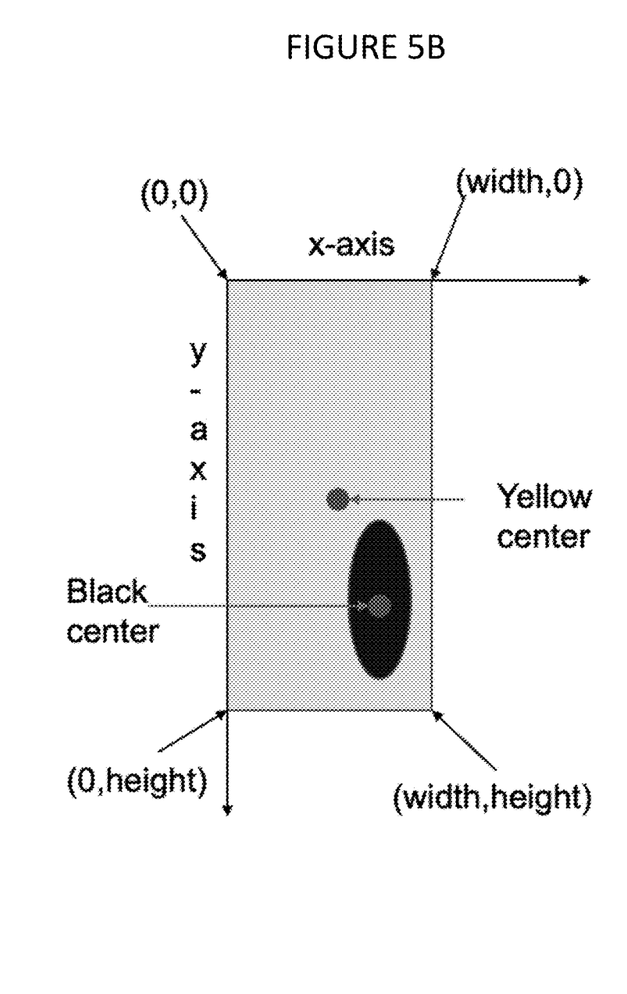

FIG. 5B depicts x right, y bottom wherein the black center is to the Right and Bottom with respect to the yellow center. In this case, the right and bottom tolerance from the user-defined tolerance may be used to determine pass or fail of this gear set.

Figure 5C:
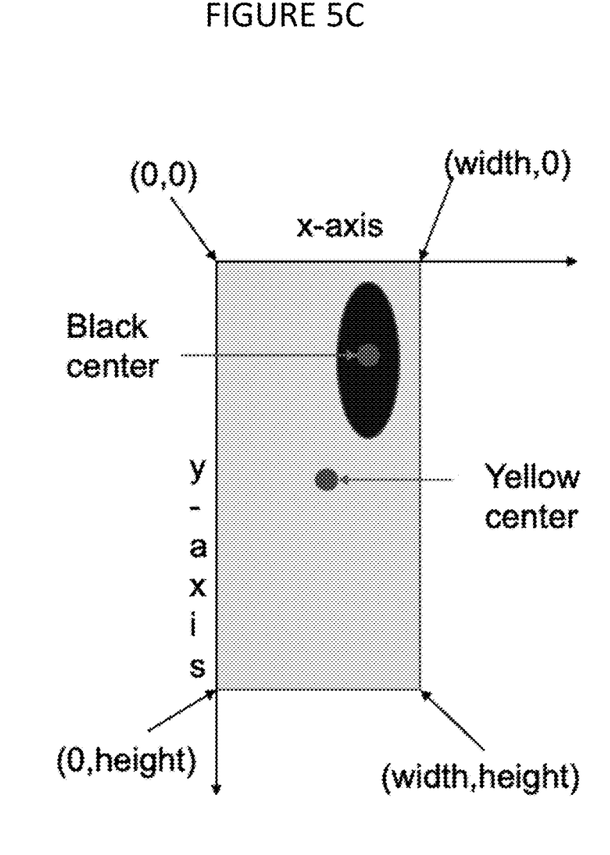

FIG. 5C depicts x right, y top wherein the black center is to the right and top with respect to the yellow center. In this case, the right and top tolerance from the user-defined tolerance may be used to determine pass or fail of this gear set.

Figure 5D:
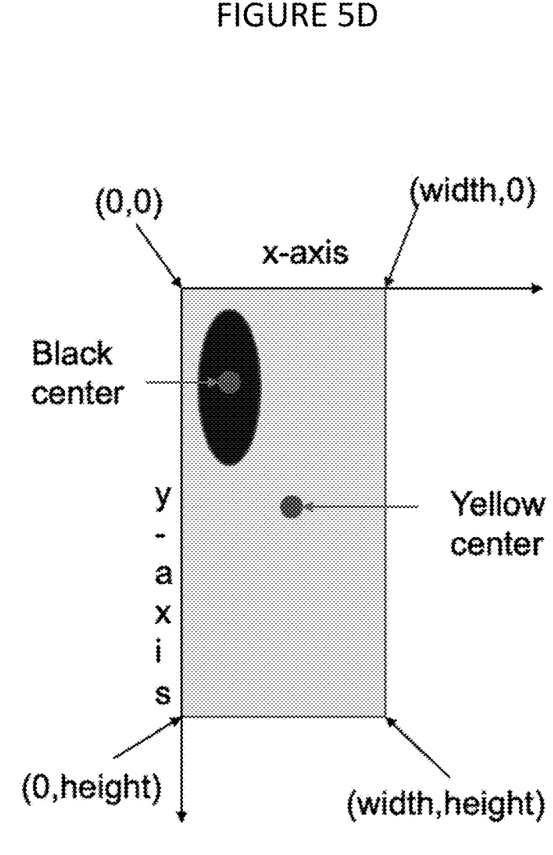

FIG. 5D depicts x left, y top wherein the black center is to the left and top with respect to the yellow center. In this case, the left and top tolerance from the user-defined tolerance may be used to determine pass or fail of this gear set.

Figure 6:
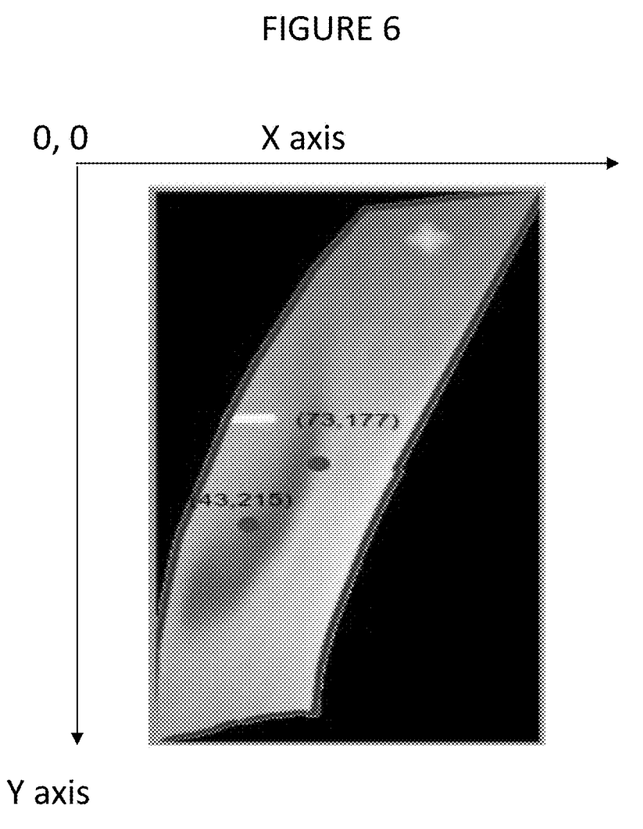
FIG. 6 depicts a use case related to user-defined tolerances according to an embodiment of the present disclosure.

FIG. 6 depicts a use case related to user-defined tolerances according to an embodiment of the present disclosure. In this use case, the midpoint of yellow is (73, 177) and the midpoint of black is (43,215). The percentage of x deviation=(73−43)/73*100=41.1 while the percentage of y deviation is (177−215)/215*100=−17.46. The x-coordinate of black is to the left of x-coordinate of yellow. Accordingly, the left tolerance may be reviewed in the exemplar table. The y-coordinate of black is to the bottom of y-coordinate of yellow. Accordingly, the bottom tolerance column of the exemplar table may be reviewed.

When an image is captured, the operator may be presented with the image, and the smartphone application may provide a response to the operator indicating whether the image captured meets quality parameters that may be pre-defined within the smartphone application. Additionally or alternatively, the operator may be prompted to set the quality parameters desired without departing from the present disclosure. If the captured image does not meet quality parameters, the smartphone application may prompt and guide the operator to re-capture the image. In an embodiment of the present disclosure, the operator may be prompted to capture images of the gear tooth at three pre-determined angles (0, 120, and 270 degrees) where the yellow powder has been applied. At the conclusion of the image capture step, there may be six images captured of the gear set: angle 0—forward, angle 0—reverse, angle 120—forward, angle 120—reverse, angle 270—forward, and angle 270—reverse. Once all of these images have been captured, the operator may be prompted to submit the images to continue the automated verification process according to embodiments of the present disclosure.

The images may be transmitted to one or more system servers that are programmed with an algorithm to check the images against a master image associated with the group for the part number and/or serial number of the gear and pinion set. This algorithm may be used to determine the extent of the mesh in an embodiment of the present disclosure. Using the algorithm, the contact area measurement may be determined, and exact deviation(s) from the master image(s) for that gear group may be identified. Area of residue on each picture as well as the area where there is no residue on the tooth may then be checked by comparing the matching algorithm against the acceptable standard for both areas for that gear type. Based on this comparison, the pass or fail result may be computed and displayed to the user on the smartphone application. It should be appreciated that the matching algorithm according to embodiments of the present disclosure can run on the smartphone itself. Additionally, or alternatively, the matching algorithm can be run using one or more servers over a network. If the matching algorithm is run on one or more servers, all images and test results can be stored on the one or more servers for historical record-keeping.

Figure 4:
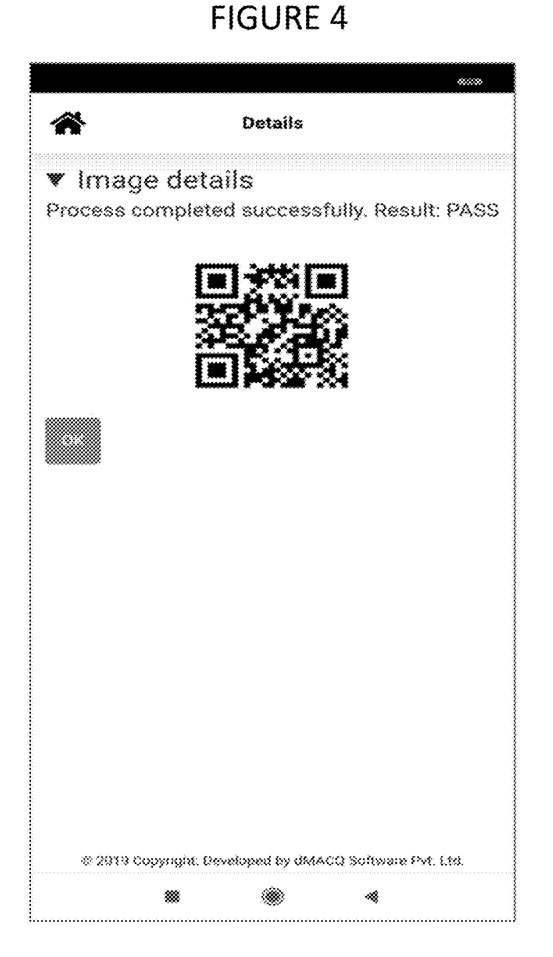
FIG. 4 is a screen shot from a smartphone application depicting how the test results may be displayed according to an embodiment of the present disclosure.

FIG. 4 is a screen shot from a smartphone application depicting how the test results may be displayed according to an embodiment of the present disclosure. As reflected in FIG. 4, the test results along with the part number and/or other measured parameters may be rendered as a QR code to be displayed on the smartphone application in an embodiment of the present disclosure. Parameters sent may include, but are not limited to, part number, serial number, and result (i.e. Pass/Fail). Other parameters may include, but are not limited to, group number, percent deviation on x-axis, and percent deviation on y-axis. Test results may include the indication of "pass" or "fail" in an embodiment of the present disclosure; however, other indicators of results may be provided without departing from the present disclosure. While the test results may be provided as QR code, it should be appreciated that the test results may be displayed on the smartphone application in other manners, such as a bar code or in text, without departing from the present disclosure.

Using the QR code depicted in FIG. 4, an operator may use a barcode scanner that may be attached to a SCADA system in an embodiment of the present disclosure to read the test results embedded in the QR code. The screen shot as depicted in FIG. 4 may include a display of a textual indication as to whether the image passed or failed in text form as well as a depiction of the QR code. When the QR code is scanned in the production system, the ERP may be updated in real-time over a wireless and/or wired network in an embodiment of the present disclosure. Accordingly, the images associated with the test along with the test results may be transmitted to the ERP for digital filing to complete the process in embodiments of the present disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for automated gear contact pattern verification, the method comprising:
   applying a yellow powder to at least one gear to be meshed to form contacts on at least one gear tooth of the at least one gear;
   using an application on a smartphone, scanning a barcode on the at least one gear to obtain a part number or a serial number associated with the at least one gear;
   using the smartphone, capturing images of the at least one gear tooth at three predetermined angles;
   using a matching algorithm run on the smartphone, the matching algorithm comprising:
      identifying a gear type based on the part number or serial number;
      identifying bounding points of a yellow portion of the at least one gear tooth, the bounding points including a midpoint of the yellow portion;
      identifying a bottom-left region, a bottom-right region, a top-left region, and a top-right region of the at least one gear tooth within the bounding points of the yellow portion;
      identifying the midpoint of a gear mesh area;
      determining a deviation between the midpoint of the yellow portion and the midpoint of the gear mesh area according to which of the four identified regions the midpoint of the gear mesh area is located, wherein a range of acceptable deviation is configured by a user to pass gear contact pattern verification, and the range is between 25% and 80%; and
   displaying test results on the smartphone, wherein the test results is based on a comparison of the determined deviation with the range of acceptable deviation and including at least an indication of pass or fail.

2. The method of claim 1, the capturing step further comprising:
   using pre-configured guides displayed on a screen by the application, the pre-configured guides including red guides; and
   cropping the captured images by recording pixel values of red guides and identifying bounding points, wherein the bounding points are identified by identifying a first and a last occurrence of the red guides on the x and y axes.

3. The method of claim 2 further comprising:
   after cropping the captured images, identifying clusters of color in the captured images; and
   confirming that the clusters of color are within pre-determined ranges and cover an area above a pre-determined set count.

4. The method of claim 3, wherein the pre-determined ranges are 100<R<255, 100<G<255, and 0<B<120 and the pre-determined set count is at least 5000 pixels.

5. The method of claim 1, wherein the three pre-determined angles are 0, 120, and 270 degrees.

6. The method of claim 1, wherein the midpoint of the yellow portion is identified using the formula:

$$\text{yellow\_}x\text{\_mid}=(\max(x\text{\_yellow})+\min(x\text{\_yellow}))/2,$$

$$\text{yellow\_}y\text{\_mid}=(\max(y\text{\_yellow})+\min(y\text{\_yellow}))/2,$$

where x_yellow and y_yellow are the x coordinates and y coordinates, respectively, of the yellow region.

7. The method of claim 1, wherein the midpoint of the gear mesh area is identified using the formula:

$$\text{black\_}x\text{\_mid}=(\max(x\text{\_black})+\min(x\text{\_black}))/2,$$

$$\text{black\_}y\text{\_mid}=(\max(y\text{\_black})+\min(y\text{\_black}))/2,$$

where x_black and y_black are the x coordinates and y coordinates, respectively, of the gear mesh area.

8. The method of claim 1, wherein the deviation between the midpoints of the yellow portion and the gear mesh area is determined using the formula:

$$\text{pct\_}x=((\text{yellow\_}x\text{\_mid}-\text{black\_}x\text{\_mid})/\text{yellow\_}x\text{\_mid})*100,$$

$$\text{pct\_}y=((\text{yellow\_}y\text{\_mid}-\text{black\_}y\text{\_mid})/\text{yellow\_}y\text{\_mid})*100,$$

where (yellow_x_mid, yellow_y_mid) and (black_x_mid, black_y_mid) are the (x, y) coordinates of the midpoints of the yellow region and the gear mesh area, respectively.

9. The method of claim 1, wherein the test results are displayed as a QR code.

10. The method of claim 9 further comprising:
    scanning the QR code in a production system, wherein when the QR code is scanned, the enterprise resource planning (ERP) is updated in real-time over a wireless network.

11. A method for automated gear contact pattern verification, the method comprising:
    using a smartphone, capturing images of at least one gear tooth at three predetermined angles;
    using a matching algorithm run on the smartphone, the matching algorithm comprising:
       identifying bounding points of a yellow portion of the at least one gear tooth, the bounding points including a midpoint of the yellow portion, wherein the midpoint of the yellow portion is identified using the formula:

$$\text{yellow\_}x\text{\_mid}=(\max(x\text{\_yellow})+\min(x\text{\_yellow}))/2,$$

$$\text{yellow\_}y\text{\_mid}=(\max(y\text{\_yellow})+\min(y\text{\_yellow}))/2,$$

where x_yellow and y_yellow are the x coordinates and y coordinates, respectively, of the yellow region;
   identifying a gear mesh area between the bounding points and a midpoint of the gear mesh area, wherein the midpoint of the gear mesh area is identified using the formula:

$$\text{black\_}x\text{\_mid}=(\max(x\text{\_black})+\min(x\text{\_black}))/2,$$

$$\text{black\_}y\text{\_mid}=(\max(y\text{\_black})+\min(y\text{\_black}))/2,$$

where x_black and y_black are the x coordinates and y coordinates, respectively, of the gear mesh area;
   determining a deviation between the midpoints of the yellow portion and the gear mesh area, wherein the deviation between the midpoints of the yellow portion and the gear mesh area is determined using the formula:

$$\text{pct\_}x=((\text{yellow\_}x\text{\_mid}-\text{black\_}x\text{\_mid})/\text{yellow\_}x\text{\_mid})*100,$$

$$\text{pct\_}y=((\text{yellow\_}y\text{\_mid}-\text{black\_}y\text{\_mid})/\text{yellow\_}y\text{\_mid})*100,$$

where (yellow_x_mid, yellow_y_mid) and (black_x_mid, black_y_mid) are the (x, y) coordinates of the midpoints of the yellow region and the gear mesh area, respectively,
   wherein a range of acceptable deviation is configured by a user to pass gear contact pattern verification, and the range is between 25% and 80%; and
   displaying test results on the smartphone, wherein the test results are based on a comparison of the determined deviation with the range of acceptable deviation and include at least an indication of pass or fail.

12. The method of claim 11, the capturing step further comprising:
    using pre-configured guides displayed on a screen by the application, the pre-configured guides including red guides; and
    cropping the captured images by recording pixel values of red guides and identifying bounding points, wherein the bounding points are identified by identifying a first and a last occurrence of the red guides on the x and y axes.

13. The method of claim 12 further comprising:
    after cropping the captured images, identifying clusters of color in the captured images; and
    confirming that the clusters of color are within pre-determined ranges and cover an area above a pre-determined set count.

14. The method of claim 13, wherein the pre-determined ranges are 100<R<255, 100<G<255, and 0<B<120 and the pre-determined set count is at least 5000 pixels.

15. A method for automated gear contact pattern verification, the method comprising:
    applying a yellow powder to at least one gear to be meshed to form contacts on at least one gear tooth of the at least one gear;

using an application on a smartphone, scanning a barcode on the at least one gear to obtain a part number or a serial number associated with the at least one gear;

using the smartphone, capturing images of the at least one gear tooth at three predetermined angles of 0, 120 and 270 degrees, the capturing step comprising:

using pre-configured guides displayed on a screen by the application, the pre-configured guides including red guides;

cropping the captured images by recording pixel values of red guides and identifying bounding points, wherein the bounding points are identified by identifying a first and a last occurrence of the red guides on the x and y axes;

identifying clusters of color in the captured images;

confirming that the clusters of color are within predetermined ranges and cover an area above a predetermined set count;

using a matching algorithm run on the smartphone, the matching algorithm comprising:

identifying a gear type based on the part number or serial number;

identifying bounding points of a yellow portion of the at least one gear tooth, the bounding points including a midpoint of the yellow portion;

identifying a bottom-left region, a bottom-right region, a top-left region, and a top-right region of the at least one gear tooth within the bounding points of the yellow portion;

identifying the midpoint of a gear mesh area;

determining a deviation between the midpoint of the yellow portion and the midpoint of the gear mesh area according to which of the four identified regions the midpoint of the gear mesh area is located, wherein a range of acceptable deviation is configured by a user to pass gear contact pattern verification, and the range is between 25% and 80%; and displaying test results on the smartphone, wherein the test results is based on a comparison of the determined deviation with the range of acceptable deviation and including at least an indication of pass or fail.

16. The method of claim 15, wherein the midpoint of the yellow portion is identified using the formula:

$$\text{yellow\_}x\text{\_mid} = (\max(x\text{\_yellow}) + \min(x\text{\_yellow}))/2,$$

$$\text{yellow\_}y\text{\_mid} = (\max(y\text{\_yellow}) + \min(y\text{\_yellow}))/2,$$

where x_yellow and y_yellow are the x coordinates and y coordinates, respectively, of the yellow region.

17. The method of claim 15, wherein the midpoint of the gear mesh area is identified using the formula:

$$\text{black\_}x\text{\_mid} = (\max(x\text{\_black}) + \min(x\text{\_black}))/2,$$

$$\text{black\_}y\text{\_mid} = (\max(y\text{\_black}) + \min(y\text{\_black}))/2,$$

where x_black and y_black are the x coordinates and y coordinates, respectively, of the gear mesh area.

18. The method of claim 15, wherein the deviation in the midpoints of the yellow portion and gear mesh area is determined using the formula:

$$\text{pct\_}x = ((\text{yellow\_}x\text{\_mid} - \text{black\_}x\text{\_mid})/\text{yellow\_}x\text{\_mid}) * 100,$$

$$\text{pct\_}y = ((\text{yellow\_}y\text{\_mid} - \text{black\_}y\text{\_mid})/\text{yellow\_}y\text{\_mid}) * 100,$$

where (yellow_x_mid, yellow_y_mid) and (black_x_mid, black_y_mid) are the (x, y) coordinates of the midpoints of the yellow region and the gear mesh area, respectively.

\* \* \* \* \*